United States Patent [19]
Riva

[11] 4,108,342
[45] Aug. 22, 1978

[54] CARRIER ATTACHMENT FOR AUTOMOBILES

[76] Inventor: Ralph D. Riva, 77 Bellman Ave., Warwick, R.I. 02889

[21] Appl. No.: 839,101

[22] Filed: Oct. 3, 1977

[51] Int. Cl.² ............................................. B60R 7/00
[52] U.S. Cl. ........................... 224/42.01; 224/42.1 B; 224/42.46 R; 248/499
[58] Field of Search ............ 224/42.01, 29 G, 42.1 B, 224/42.1 E, 42.1 R, 42.46 R, 42.31, 29 R, 29 H; 248/499, 503, 505; 24/265 H, 265 CD, 73 VA, 84 A, 115 H

[56] References Cited

U.S. PATENT DOCUMENTS

| | | | |
|---|---|---|---|
| 1,552,535 | 9/1925 | Beerstecher | 224/42.31 |
| 2,488,263 | 11/1949 | Bishman | 224/42.46 R |
| 2,635,796 | 4/1953 | Davolt | 224/42.46 R |
| 3,701,507 | 10/1972 | Bell | 248/499 |

FOREIGN PATENT DOCUMENTS 284,240  11/1952  Switzerland ......................... 224/42.1 E

*Primary Examiner*—Trygve M. Blix
*Assistant Examiner*—Kenneth W. Noland
*Attorney, Agent, or Firm*—Salter & Michaelson

[57] ABSTRACT

A carrier holder for automobiles and the like including a line having a closed loop portion at one end thereof and an enlarged plug at the other end thereof. The plug is adapted for positioning within the trunk or hood compartment of an automobile such that the line will project outwardly thereof through the space between the trunk or hood and the adjacent fenders. A suction cup is positioned along the line proximal to the plug and serves as a temporary positioning element for positioning the device with respect to the car fender. In position, the closed loop portion of the line extends outwardly over the fenders and serves as an attachment point for securing cargo to the automobile. Generally, two such devices are used in tandem so as to support large loads such as lumber, tubing and the like from the side of the automobile. Additionally, a hook may be attached to that end of the loop projecting behind the plug so that the device may additionally be used to connect with a car's roof molding or the like to additionally function as a tie down holder for roof-supported cargo.

6 Claims, 5 Drawing Figures

CARRIER ATTACHMENT FOR AUTOMOBILES

BACKGROUND OF THE INVENTION

This invention relates to a carrier attachment for automobiles and the like, in particular one adapted to make use of the break or space between an automobile's hood or trunk and its adjacent fenders. Devices which project outwardly from cooperating portions of an automobile in which an opening is formed are known. For instance, U.S. Pat. No. 3,701,507 shows an attachment which is gripped beneath the hood of an automobile and projects between the hood and adjacent fenders. Another patent of interest is U.S. Pat. No. 2,302,300 which shows a carrier having units that extend sidewards from the front and rear of the car and which are held by the molding adjacent the front and rear car windows. These and other devices, while useful in supporting cargo from automobiles and the like, require a relatively high degree of care in attachment to the automobile and often rely on particular vehicle construction for attachment. It would be desirable to avoid the necessity of having to use such care in securing devices of this type and further it would be desirable to not have to be dependent on a particular vehicle construction for attachment.

SUMMARY OF THE INVENTION

It is accordingly a primary object of the present invention to provide a device useable in connection with the supporting of cargo loads from an automobile and the like which may be simply and easily positioned in regard thereto and yet insures positive attachment in a manner which will not harm the finish or otherwise affect the functioning of the vehicle.

A still further object of the present invention is to provide a device of the immediately aforementioned type in which means are provided for temporarily positioning such device with regard to the automobile such that one person may unassistedly position such device or devices on the automobile in a safe and straightforward manner.

A still further object of the present invention is the provision of the device of the immediately aforementioned type in which the relatively narrow separation or break between an automobile trunk or hood and its surrounding fenders may be utilized as the means by which the device is secured to the automobile.

Still another object of the present invention is the provision of a device of the immediately aforementioned type which can additionally be utilized for attachment to the moldings commonly found in an automobile at the roof line thereof.

A further object is the provision of a device of the character described which, when mounted in operative position with respect to an automobile, is securely held with vertually no likelihood of the device becoming inadvertantly detached therefrom.

These and other objects of the present invention are accomplished by the provision of a device including a line generally in the form of a closed loop and adapted to receive a relatively large retaining plug at one end thereof. The other end of the line forms an attachment point by which cargo may be tied thereto. The line also includes temporary positioning means in the form of a suction cup such that the device may be temporarily secured to the automobile fender. In this way the device can be positioned on the fender with regard to the trunk or hood opening so that the plug is located inwardly thereof such that when the trunk or hood is closed the line projects through the opening between the trunk or hood and its adjacent fenders and the plug prevents the line from being withdrawn from the compartment.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
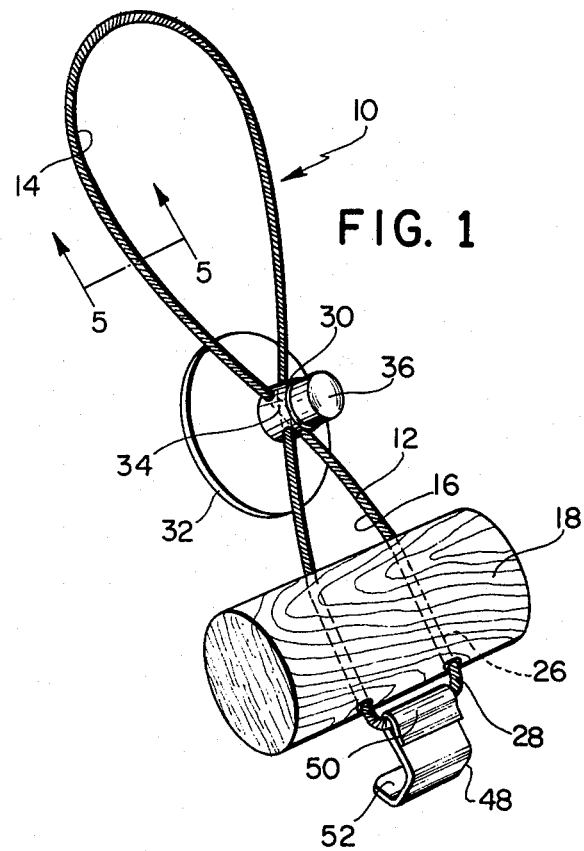
FIG. 1 is a perspective view showing the device of the present invention.

Turning now to the drawing and particularly FIG. 1, the device 10 of the present invention includes a line or cable generally formed in a closed loop construction and having a first loop portion 14 at one end thereof and a second loop portion 16 at the opposite end. A retaining plug 18 generally of cylindrical shape and having a diameter substantially larger than the break or separation 20 between the hood or trunk 22 of an automobile and its adjacent fender portions 24 is secured to the line at the second loop portion 16. The plug is provided with a pair of spaced openings 26 through which the rear loop portion 16 is threaded, said rear loop portions terminating in a U-shaped extension 28. The ends of the line 12 may be interconnected in any known manner, such as braiding or by the use of an intermediate connecting member (not shown). The opposed lengths of the line 12 are passed through the shank 30 of a suction cup 32 in criss-cross fashion so that the line assumes a generally figure 8 configuration, there being separate opposed passages 34 provided through the shank 30 for such purpose, although a single passage may be utilized. Furthermore, the head 36 of the shank is generally flat such that substantial pressure may be exerted on the suction cup 32 so as to force it into contact with that portion of the fender 24 adjacent the break or separation 20. Generally, the line 12 is formed from wire cable having a plurality of strands over which a plastic covering 38 is provided so that the line will not scratch or otherwise mar the finish of the automobile. The plug 18 is generally formed of wood, although any other suitable structurally strong material could be utilized such as metal or plastic. Also, the suction cup 32 may be moved relative to the line 12 thereby adjusting the distance between the suction cup 32 and the plug 18 and also adjusting the size of the loop 14.

Figure 3:
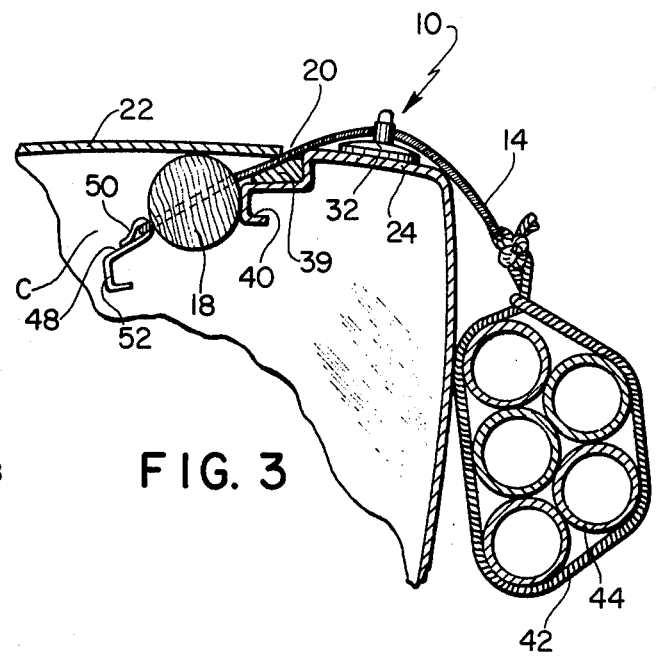
FIG. 3 is a side sectional view on an enlarged scale taken through the hood or trunk of an automobile and shows the manner in which the present device is anchored therein.

In operation, the device is placed on a fender 24 adjacent the open hood or trunk 22 such that the rear portion of the loop having the plug 18 fastened thereto projects into the engine or trunk compartment C and that portion of the line 12 intermediate the plug and the suction cup passes over the inner edge of the fender adjacent the break 20. The device is then temporarily attached in such position by forcing the suction cup 32 into secure contact with the upper surface of the fender 24. Thereafter the trunk or hood lid 22 is closed so as to capture the plug 18 in the compartment C. Also, that portion of the line 12 extending through the break 20 extends across any sealing material 39 provided on the fender 24 and the plug 18 may contact inner portions of the fender such as the curl 40 shown in FIG. 3 of the drawing.

Figure 2:
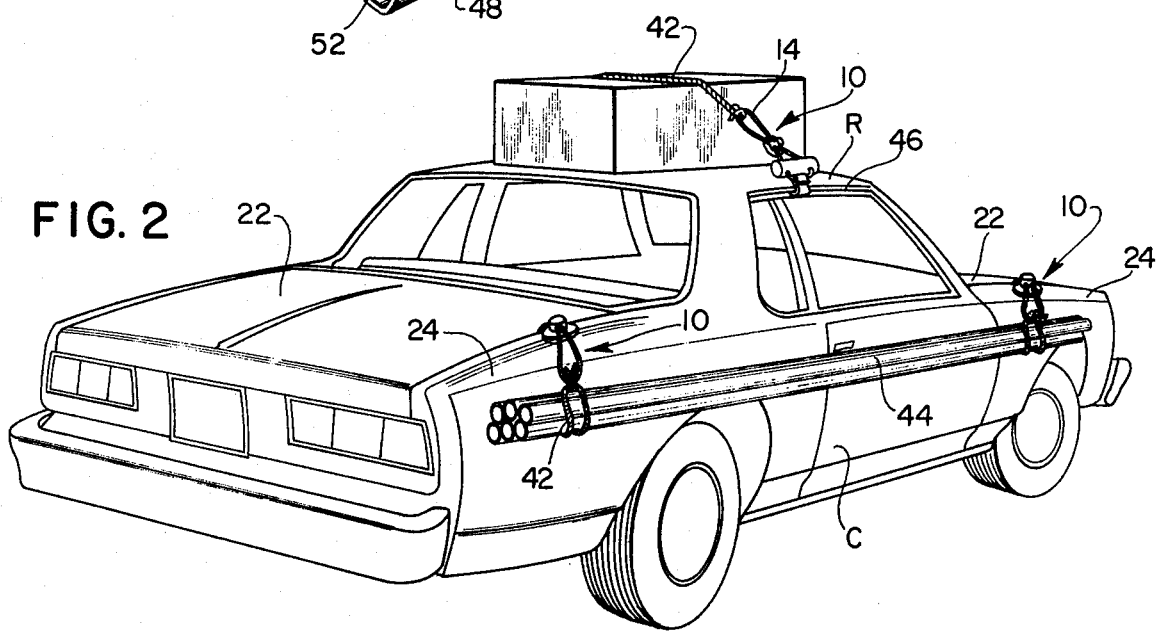
FIG. 2 is a perspective view showing such device utilized in tandem and in alternate modes in conjunction with a conventional automobile.
Figure 5:
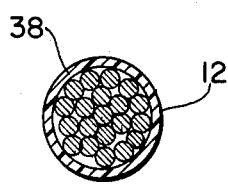
FIG. 5 is a cross-sectional view of the line taken along the line 5—5 of FIG. 1.

It should also be pointed out that it is generally preferable to loosely position the plug 18 within the compartment prior to closing the lid 22 so as to insure that the plug projects inwardly a proper distance so as to not interfere with the closing of the lid. Thereafter, the suction cup can be disengaged and the line 12 pulled outwardly so as to assure wedging contact between the plug and the fender or lid portions such that it cannot be removed from the compartment C and to accordingly securely position the device with respect to the fender. The forward portion of the loop 14 thus projects at least partially over the fender 24 and outwardly therefrom and serves as an anchor or tie down point by which an additional rope or line 42 used to surround cargo such as lumber or pipe 44 can be attached. Generally the devices shown in FIG. 2 are used in pairs so as to sling the cargo 44 on the side of the automobile, as shown most clearly in FIG. 2. Also, when not in direct use, that is, when the device 10 is not being utilized to actively support cargo, the suction cup 32 also being larger than the break or separation 20 prevents any chance of the device slipping or otherwise being withdrawn into the compartment C.

Figure 4:
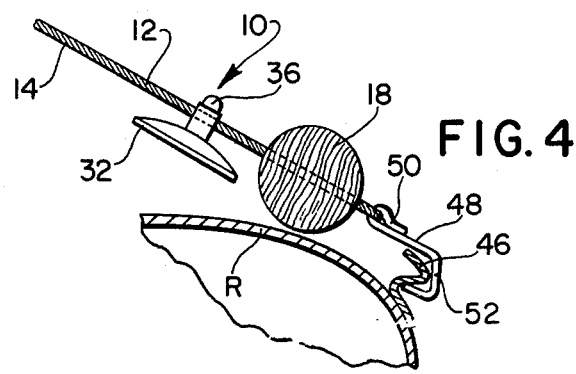
FIG. 4 is a side view of an alternate embodiment of the invention wherein the device is used as an anchor from the roof molding of an automobile.

The device of the present invention may be alternatively used in connection with the rain gutters or moldings of an automobile roof R such as the roof molding 46 shown in FIGS. 2 and 4 of the drawing. For such purpose a metal hook 48 generally of S-shaped configuration is attached to the U-shaped portion 28. One of the legs 50 of the hook is closed over the line 12 so as to secure the hook 48 thereto and the other leg 52 thereof presents a U-shaped configuration dimensioned so as to be positioned beneath the molding 46, as shown in FIGS. 2 and 4. Another device 10 would be similarly mounted with respect to the roof molding 46 on the opposite side of the vehicle and an additional line 42 used to connect the oppositely disposed loop portions 14 to each other, and thus serve to hold down roof supported cargo. In this embodiment, where the hook 48 is utilized, the plug 18 and suction cut 32 generally serve no functional purpose; however, the plug 18 may, dependent on the height of the roof cargo, act as a spacer preventing the line 12 from contacting the roof. Also, although only one pair of oppositely disposed units 10 are shown in FIGS. 2 and 4, two or more of such units could be mounted on each side of the vehicle, with the lines 42 either extending straight across, or criss-crossing, if desired.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device adapted for use in connection with vehicles and the like having hood and trunk enclosures to form a tie down for the support of cargo comprising, a line having a loop portion at one end thereof and an enlarged retaining plug secured thereto at the other end thereof, said retaining plug of a dimension substantially greater than the width of the peripheral spaces between said hood and trunk enclosures and adjacent fenders and adapted for positioning interiorly of said hood or trunk compartment, said line of a dimension less than the width of said spaces so as to project therethrough and outwardly therefrom so that said loop portion extends at least partially outward from said enclosures, and temporary positioning means mounted on said line intermediate the ends thereof and adapted to be positioned outwardly of said compartments, said temporary positioning means adapted to position said device with respect to said fenders prior to closing said hood or trunk enclosures, said temporary positioning means comprising a suction cup having an upwardly projecting shank through which said line extends, said loop portion extending outwardly from said shank.

2. A device adapted for use in connection with vehicles and the like having hood and trunk enclosures to form a tie down for the support of cargo comprising, a line having a loop portion at one end thereof and an enlarged retaining plug secured thereto at the other end thereof, said retaining plug of a dimension substantially greater than the width of the peripheral spaces between said hood and trunk enclosures and adjacent fenders and adapted for positioning interiorly of said hood or trunk compartment, said line of a dimension less han the width of said spaces so as to project therethrough and outwardly therefrom so that said loop portion extends at least partially outward from said enclosures, and temporary positioning means mounted on said line intermediate the ends thereof and adapted to be positioned outwardly of said compartments, said temporary positioning means adapted to position said device with respect to said fenders prior to closing said hood or trunk enclosures, said temporary positioning means being a suction cup, said line being a closed loop, said loop being in the form of a figure 8 with a first portion of said loop adapted to serve as a cargo tie down point and a second portion adapted to secure said plug to said line and at least partially project into one of said compartments, said suction cup having an upwardly projecting shank through which opposed sides of said line project so as to divide said loop into said first and second portions.

3. The device of claim 2, the shank of said suction cup having a flat upper surface as an aid in forcing said cup against said fender.

4. A device adapted for use in connection with vehicles and the like having hood and trunk enclosures to form a tie down for the support of cargo comprising, a line having a loop portion at one end thereof and an enlarged retaining plug secured thereto at the other end thereof, said retaining plug of a dimension substantially greater than the width of the peripheral spaces between said hood and trunk enclosures and adjacent fenders and adapted for positioning interiorly of said hood or trunk compartment, said line of a dimension less than the width of said spaces so as to project therethrough and outwardly therefrom so that said loop portion extends at least partially outward from said enclosures, and temporary positioning means mounted on said line intermediate the ends thereof and adapted to be positioned outwardly of said compartments, said temporary positioning means adapted to position said device with respect to said fenders prior to closing said hood or trunk enclosures, said temporary positioning means being a suction cup, said plug being of generally cylindrical shape of a diameter substantially larger than the width of said spaces between said fenders and said hook and trunk enclosures and having a pair of spaced openings projecting laterally therethrough, said line passing through said openings at one side and interconnected to each other at the opposite side to form a second closed loop portion so as to retain said plug to said line.

5. The device of claim 4, including a hook attached at one end thereof to said second closed loop portion of said line projecting behind said plug and having another end of generally U-shaped configuration adapted to engage roof moldings or the like of said vehicle and wherein said firstloop portion is adapted to project towards the opposite side of the vehicle over the roof thereof so as to form a tie down for roof supported cargo.

6. A device adapted for use in connection with vehicles and the like having hood and trunk enclosures to form a tie down for the support of cargo comprising, a line having a loop portion at one end thereof and an enlarged retaining plug secured thereto at the other end thereof, said retaining plug of a dimension substantially greater than the width of the peripheral spaces between said hood and trunk enclosures and adjacent fenders and adapted for positioning interiorly of said hood or trunk compartment, said line of a dimension less than the width of said spaces so as to project therethrough and outwardly therefrom so that said loop portion extends at least partially outward from said enclosures, and temporary positioning means mounted on said line intermediate the ends thereof and adapted to be positioned outwardly of said compartments, said temporary positioning means adapted to position said device with respect to said fenders prior to closing said hood or trunk enclosures, said temporary positioning means being a suction cup, said line projecting behind said plug and a hook having one end thereof attached to said line portion projecting behind said plug, said hook having another end adapted to engage the moldings or the like of said vehicles.

* * * * *